(12) United States Patent
Lometti et al.

(10) Patent No.: US 6,647,519 B1
(45) Date of Patent: Nov. 11, 2003

(54) MISMATCH DETECTION IN SDH FRAME TRACE IDENTIFIERS

(75) Inventors: Alberto Lometti, Merate (IT); Luca Razzetti, Sesto San Giovanni (IT); Giovanni Traverso, Rovagnate (IT); Roberto Cardillo, Domodossola (IT)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/673,184

(22) PCT Filed: Mar. 26, 1999

(86) PCT No.: PCT/EP99/02414

§ 371 (c)(1),
(2), (4) Date: Oct. 12, 2000

(87) PCT Pub. No.: WO99/53641

PCT Pub. Date: Oct. 21, 1999

(30) Foreign Application Priority Data

Apr. 15, 1998 (IT) .......................... T098A0323

(51) Int. Cl.$^7$ ........................ G01M 31/28; H03M 13/00
(52) U.S. Cl. ........................ 714/715; 714/758
(58) Field of Search ................. 714/715, 758; 370/465, 466, 248

(56) References Cited

U.S. PATENT DOCUMENTS

| | | | |
|---|---|---|---|
| 4,242,752 A | * 12/1980 | Herkert | ....................... 714/759 |
| 5,701,293 A | 12/1997 | Fujii | |
| 5,737,310 A | * 4/1998 | Goto | ........................... 370/222 |
| 6,021,112 A | * 2/2000 | Sugawara | ..................... 370/222 |
| 6,104,702 A | * 8/2000 | Vissers | ........................ 370/241 |
| 6,226,270 B1 | * 5/2001 | Chiku et al. | .................. 370/248 |
| 6,421,322 B1 | * 7/2002 | Koziy et al. | ................. 370/248 |
| 6,426,958 B1 | * 7/2002 | Crossett et al. | ............. 370/466 |

FOREIGN PATENT DOCUMENTS

| | | |
|---|---|---|
| EP | 0 766 421 A2 | 4/1997 |
| JP | 08 139 702 | 5/1996 |

* cited by examiner

*Primary Examiner*—Albert Decady
*Assistant Examiner*—Joseph D. Torres
(74) *Attorney, Agent, or Firm*—Sughrue Mion, PLLC

(57) ABSTRACT

A method and circuit for mismatch detection in SDH-coded frame trace identifiers within a telecommunication network, wherein received trace identifiers are compared with expected trace identifiers in determined locations of the communication network, to detect if a misconnection event has occurred and generate a corresponding alarm signal. The method comprises the steps of: a) validating the received trace identifier (TI) and issuing a corresponding validation signal (CRC7, CNST); b) comparing the received trace identifier (TI) with an expected trace identifier (ETI) and issuing a corresponding validation signal (MTC1, MTC16); c) evaluating the validation signal (CRC7, CNST) and the match signal (MTC1, MTC16); and d) generating a matching state signal (SVAL1, SVAL16) according to the result of the evaluation as per step c), wherein steps a) and b) are executed in parallel.

13 Claims, 4 Drawing Sheets

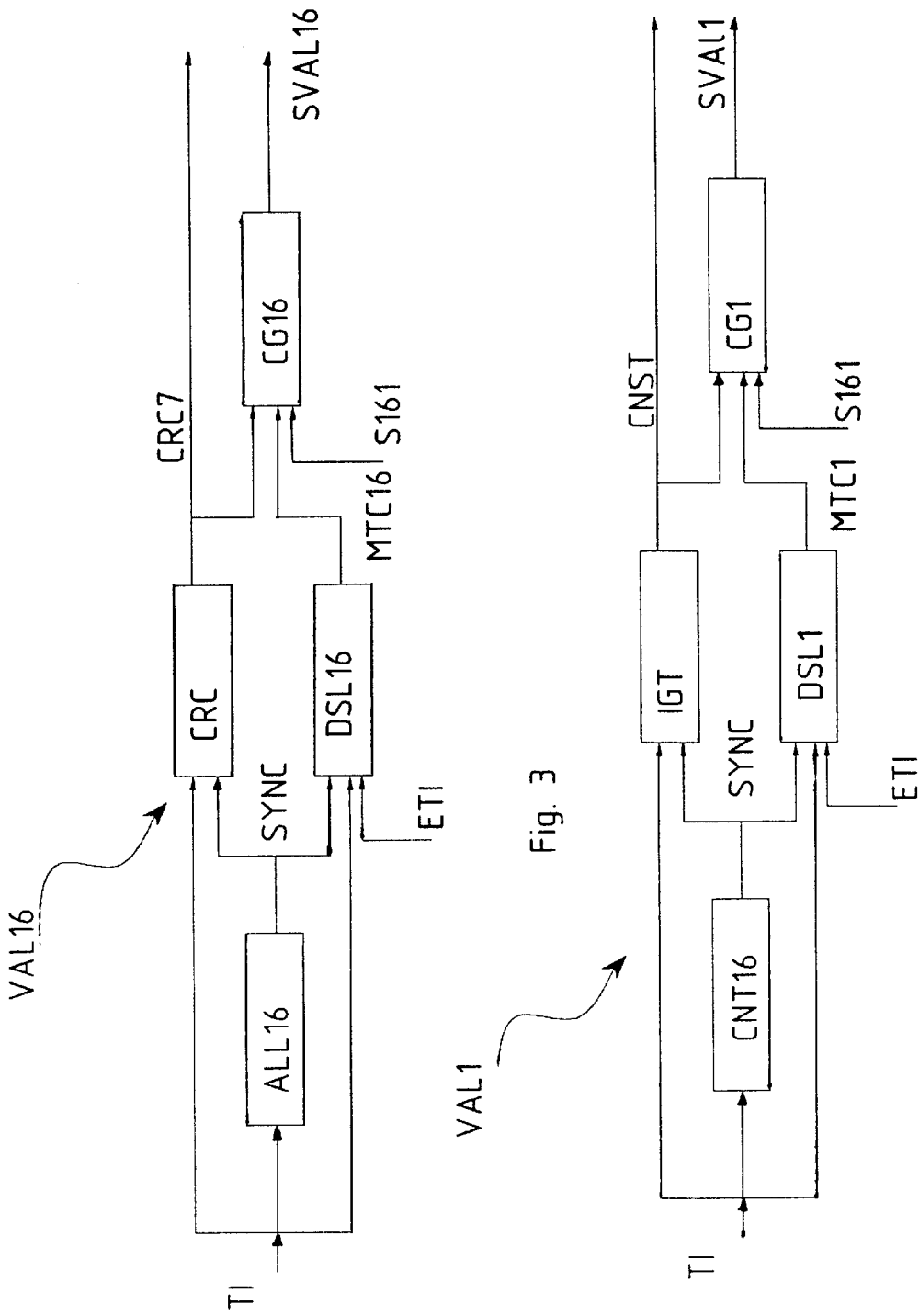

MISMATCH DETECTION IN SDH FRAME TRACE IDENTIFIERS

BACKGROUND OF THE INVENTION

The present invention relates to a mismatch detection method in trace identifiers contained in data frames, in particular SDH (Synchronous Digital Hierarchy) coded data frames within a telecommunication network, wherein said received trace identifiers are compared with expected trace identifiers in determined locations of the communication network, to detect if a misconnection event has occurred and generate an alarm signal.

During the past recent years SDH protocol has been increasingly adopted in the field of telecommunication networks.

A technique has been developed under SDH protocol to detect the so-called misconnections. The latter occur whenever information is inserted in a given input or transmitter in the network and a certain type of connection has to be provided within the network, in order to let said information reach a given output or receiver. A misconnection occurs when information is received at a network output from a wrong or undue input, e.g. due to a wrong routing of said information.

Therefore, a Trace Identifier has been developed and standardized to detect misconnections. Said trace identifier consists of a 1-byte or 16-bytes string, as the case may be, which is introduced in the telecommunication network. The receiver reached by the string has to validate the received string to make sure it is a valid string, not corrupted by line errors, and compare it with an expected value, to verify that it is connected with the right transmitter. If this condition is not satisfied, the receiver has to issue a trace identifier mismatch signal (TIM).

A trace identifier is specified by many standarization protocols, such as ITU-T G707 and ITU-T G783. The trace identifier for the 1-byte string has a simple code whose values range from 0 to 255; in the 16-bytes string or frame the first byte has a frame start marker bit and it also includes in 7 bits the result of a Cyclic Redundancy Code (CRC-7) calculation carried out on the previous transmitted frame. The above standards provide insertion of the calculation result of Cyclic Redundancy Code for error detection, i.e. the function of an error correction code. The cyclic redundancy code algorithm will be described more in detail later, specifically with reference to FIG. 3. The remaining 15 bytes contain 15 characters each, the same in each frame. FIG. 1 shows general schematics of the trace identifier TI as defined by the above standards. A 16-bytes trace identifier TI-16 consists of 16-bytes, BY1 to BY16, each one consisting of 8 bits, B1 to B8. Each first bit B1 of each byte BY1 . . . BY16 represents the frame start marker MK. Bits B2 . . . B8 of the first byte BY1 are C1 . . . C7 bits forming a validation word WCRC7, and they are the result of the cyclic redundancy code operation over the previous transmitted trace identifier TI. The remaining bits, indicated as a whole with X, form the data bits $D_i$ of the trace identifier TI, which belong to each input wherefrom the frame is coming. A 1-byte trace identifier TI-1 merely consists of 1-byte BY1, which is formed by 8 bits B1 to B8 representing a number ranging 0 to 255.

However, the above standards do not concern any methods to handle this trace identifier in order to issue an alarm signal in a misconnection event.

EP 0 766 421 (D1), which is considered the closest prior art, discloses a mismatch detection method in trace identifiers contained in SDH-coded data frames. D1 provides for two check steps, a validation step and a comparison step between the received trace identifier and an expected trace identifier. The two steps in D1 are not carried out in parallel and furthermore are executed only using 16 bytes trace identifiers and through the so called persistency check method. Persistency check with depth N means that a trace identifier which is periodically transmitted has to be observed at the receiving side for N consecutive times to be considered valid (i.e. not affected by transmission errors). This results in an apparatus requiring an high number (48) of memory cells for storing three 16-bytes strings and operating in a slow manner. Furthermore, the method and apparatus according to D1 is not usable for 1-byte string trace identifiers.

Moreover, no other valid mismatch detection methods are available in trace identifiers, in particular any methods able to produce TIM signals, considering both the probability of line error events and standard requirements in respect of misconnection detection speed.

SUMMARY OF THE INVENTION

It is the main object of the present invention to overcome the above drawbacks and provide a mismatch detection method and circuit in trace identifiers able to efficiently detect misconnections events, which is compatible with the standards and considering both the probability of transmission line error and misconnection detection speed. The method and circuit according to the invention should use a reduced amount of memory to process trace identifiers, both 1-byte and 16-bytes trace identifiers.

According to the present invention, a mismatch detection method and circuit is provided incorporating the features of the annexed claims, which form an integral part of the present description.

The mismatch detection method according to the invention comprises the steps of: a) validating the received trace identifier and issuing a correspondent validation signal; b) comparing the received trace identifier with an expected trace identifier and issuing a correspondent match signal; c) evaluating the validation signal and the match signal; and d) generating a matching state signal according to the result of the evaluation as per step c), and is characterized in that the steps a) and b) are executed in parallel and further in that steps a) to d) are provided both for 16-bytes length trace identifiers and 1-byte length trace identifiers, wherein the validating step is carried out through a Cyclic Redundancy Code check in case of 16-bytes length trace identifiers and a Persistency Check in case of 1-byte length trace identifiers.

The mismatch detection circuit according to the invention comprises: means for validating the received trace identifiers and issuing a correspondent validation signal; means for comparing the received trace identifier with an expected trace identifier and issuing a correspondent match signal; means for evaluating the validation signal and the match signal; and means, respondent to said evaluating means, for generating a matching state signal, and is characterized in that said validation means and said match detection means are arranged in parallel with respect to the input of the received trace identifier with both their outputs being connected with a logic means suitable to generate match state signals and in that the circuit is able to operate on both 16-bytes length trace identifiers and 1-byte length trace identifiers, wherein the validating means operate through a Cyclic Redundancy Code check in case of 16-bytes length trace identifiers and a Persistency Check in case of 1-byte length trace identifiers.

BRIEF DESCRIPTION OF THE DRAWINGS

Further objects, features and advantages of the present invention will become apparent from the following detailed description and annexed drawings, which are provided by way of a non limiting example, wherein:

FIG. 3 shows a schematics of circuitry details of the circuit implementing the mismatch detection method in trace identifiers contained in frames, in particular SDH-coded data frames within a telecommunication network, in a communication network as represented in FIG. 2;

FIG. 4 shows a schematics of second circuitry details of the circuit implementing the mismatch detection method in trace identifiers contained in frames, in particular SDH coded data frames within a communication network as represented in FIG. 2.

FIG. 2 shows a mismatch detection circuit 1 in trace identifiers.

DETAILED DESCRIPTION OF THE INVENTION

Figure 2:
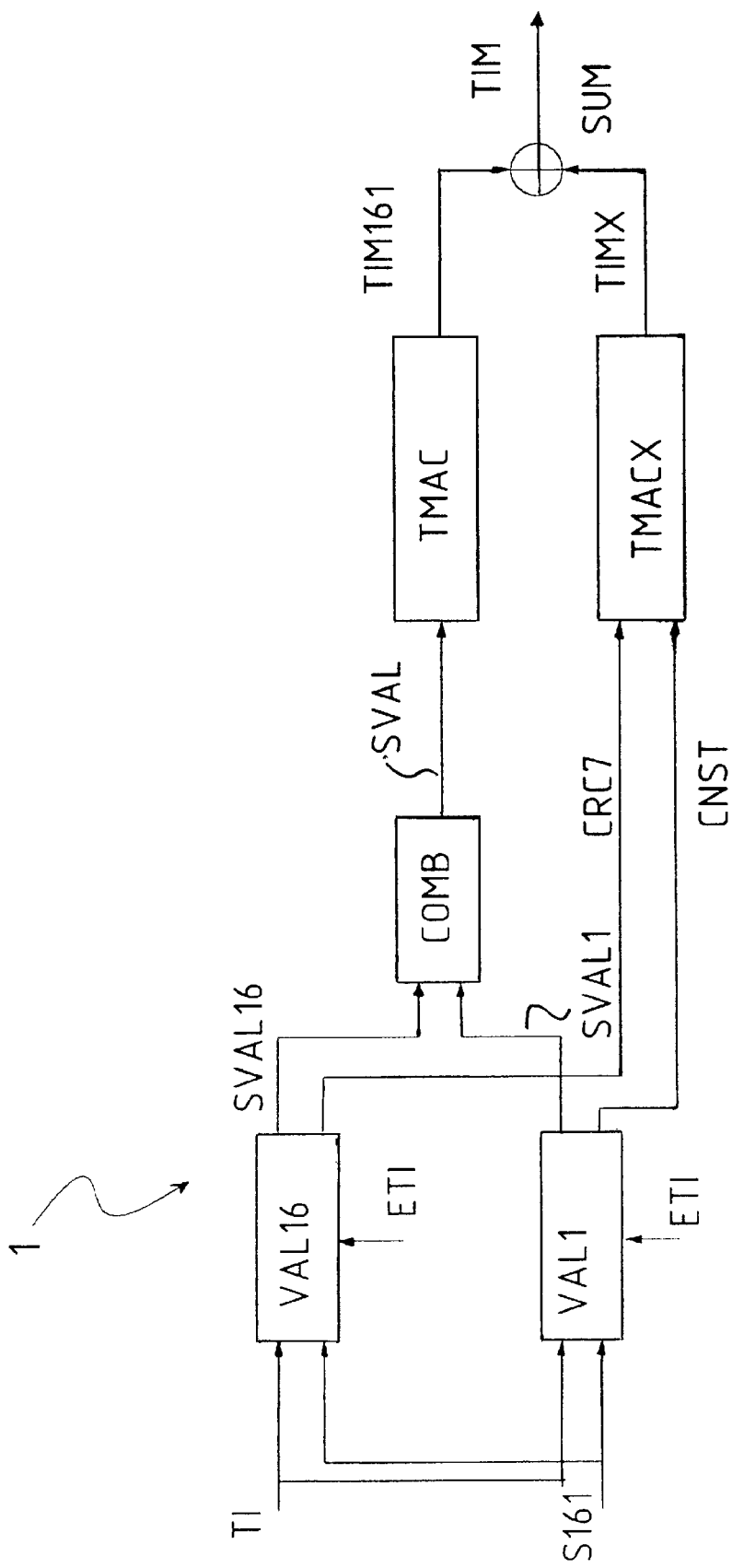
FIG. 2 shows a schematics of a circuit implementing the mismatch detection method in trace identifiers contained in frames, in particular SDH-coded data frames within a telecommunication network, according to the present invention.

A sequence of trace identifiers TI is indicated on the input to the mismatch detection circuit 1 for trace identifiers. As it is known, said trace identifiers TI are contained in the header of an SDH frame, wherein they are assigned a determined position. In the representation of FIG. 2 it is supposed that trace identifiers TI have already been fetched by the corresponding SDH frame through a proper circuit not shown here. Said mismatch detection circuit 1 can be included in any receiver within the communication network, not only at network outputs, but in all network nodes where the SDH frame 4 is opened to verify the matching of the trace identifier TI.

The sequence of trace identifiers TI inputs a 16-bytes validation block VAL16 and in parallel a 1-byte validation block VAL1. Moreover, said 16-bytes validation block VAL16 and 1-byte validation block VAL1 receive at one of their further inputs, an expected length signal S161. Said expected length signal S161 contains information as to whether the trace identifier TI has a 16-bytes length or 1-byte length. The expected length signal S161 can also be obtained at the receiver, measuring the length of the expected trace identifier TI.

Both the 16-byte validation block VAL16 and the 1-byte validation block VAL1 have an output providing an equality signal SVAL1 or SVAL16, which can have three values: true value V, false value F, 'don't care value' DC. Additionally, the 16-bytes validation block VAL16 issues a correct validation word signal CRC7 to an output, whereas the 1-byte validation block VAL1 issues a constant packet signal CNST to an output.

Downstream the 16-bytes validation block VAL16 and the 1-byte validation block VAL1 a combination block COMB is provided, which is suitable to logically combine the equality signal SVAL1 and the equality signal SVAL16, in order to produce a single equality signal SVAL alone driving a finite states machine TMAC. Said finite states machine TMAC outputs a misconnection signal TIM161, which reaches an adder block SUM.

A second finite states machine TMACX is located in parallel to the finite states machine TMAC. Said second finite states machine TMACX receives the correct validation word signal CRC7 and the constant packet signal CNST from the 16-byte validation block VAL16 and the 1-byte validation block VAL1, respectively. Consequently, a non structured identifier signal TIMX is originated by said second finite states machine TMACX and also sent to the adder block SUM, whose output produces the misconnection alarm signal TIM.

FIG. 3 shows the 16-bytes validation block VAL16. It comprises a multiframe aligner block ALL16, which generates a sync pulse SYNC every time two subsequent frame markers MK with 15 data bytes between are detected. The sync pulse SYNC is generated at the frame marker MK. Then a redundancy coding detector CRC and a mismatch detector DSL16 are provided. The redundancy coding detector CRC receives at one input the trace identifier TI and at another input the sync pulse SYNC. The redundancy coding detector CRC outputs the correct word signal CRC7. Validation word WCRC7 is obtained inside the redundancy coding detector CRC by multiplying the polynomial representation of the trace identifier TI by $Z^7$, then by dividing module 2 by the generator polynomial $Z^7+Z^3+1$ and using the remainder after the division as the validation word WCRC7. This procedure for obtaining the validation word WCRC7 is known and coded by the standards previously mentioned.

As known, in fact, it is obtained by initially multiplying the trace identifier TI by $Z^7$, equalling an insertion of seven zeros on the right of the trace identifier TI:

| | |
|---|---|
| $1*Z^{134} + 0*Z^{133} + \ldots + 0*Z^{127} +$ | 1-byte with CRC7 bits |
| $0*Z^{126} + X*Z^{125} + \ldots + X*Z^{119} +$ | $2^{nd}$ byte |
| $\ldots +$ | other bytes |
| $0*Z^{14} + X*Z^{13} + \ldots + X*Z^7 +$ | 16th byte |
| $0*Z^6 + 0*Z^5 + \ldots + 0*Z^0$ | multiplication by $Z^7$ |

Then it is divided by the generator polynomial $Z^7+Z^3+1$.

The resulting validation word WCRC7 is static, since also X bits are static.

The validation word WCRC7, as it is known, will not change provided there are no line errors. All trace identifiers TI from one same source or transmitter contain the same validation word CRC7 and produce the same validation word CRC7 applying the redundancy code algorithm.

The redundancy code detector CRC according to the present invention calculates the validation word CRC7 in a parallel and iterative mode.

In fact, since it is known and proved that the remainder after the division of a general polynomial of n degree for the generator polynomial $Z^7+Z^3+1$ can be expressed as:

$$(b_1Z^n+b_2Z^{n-1}+b_3Z^{n-2}+\ldots+b_8Z^{n-7})\text{MOD}(Z^7+Z^3+1)=$$
$$(b_5\oplus b_2\oplus b_1)Z^{n-8}+(b_6\oplus b_3\oplus b_2)Z^{n-9}+(b_7\oplus b_4\oplus b_3)Z^{n-10}+$$
$$(b_8\oplus b_5\oplus b_4)Z^{n-11}+(b_6\oplus$$
$$b_2)Z^{n-12}+(b_7\oplus b_3)Z^{n-13}+(b_8\oplus b_4\oplus b_1)Z^{n-14}. \quad (1)$$

calling $P2(Z), \ldots, P16(Z)$ the polynomial expressions of the 15 bytes BY2 ... BY16 of the 16-bytes trace identifier TI-16, the procedure will comprise the step of:

a) dividing P2(Z) by the generator polynomial $Z^7+Z^3+1$, obtaining a remainder polynomial Q2(Z);
b) adding the remainder polynomial Q2(Z) to the polynomial P3(Z) representative of the byte BY3, to obtain a sum polynomial S2(Z);
c) dividing the sum polynomial S2(Z) by the generator polynomial $Z^7+Z^3+1$, to obtain a remainder polynomial Q3(Z);
d) continuing iteratively with steps b) and c) till a remainder polynomial Q16(Z) is obtained, which represents the remainder after division of the polynomial representing the trace identifier TI-16 for the generator polynomial $Z^7+Z^3+1$.

Figure 1:
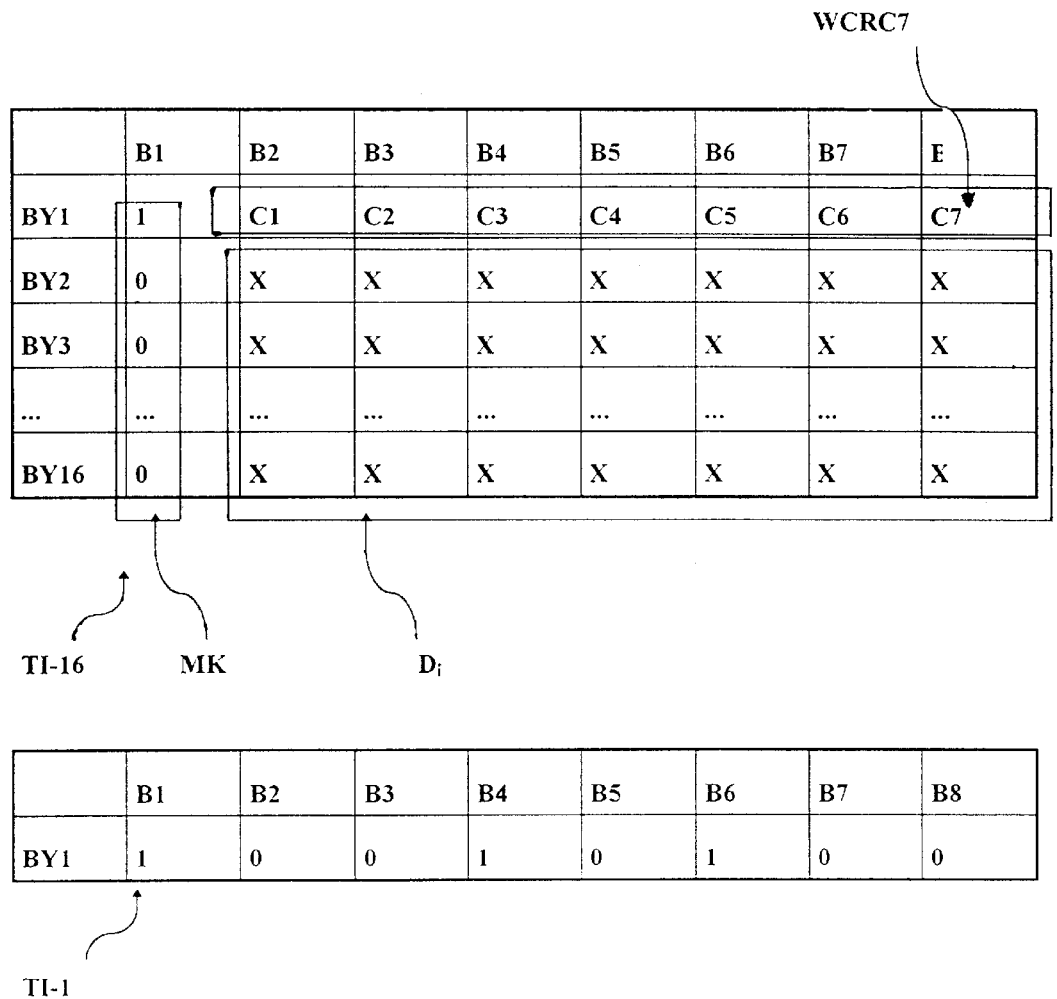
FIG. 1 shows a trace identifiers schematics to be used jointly with the mismatch detection method in trace identifiers contained in frames, in particular SDH-coded data frames within a telecommunication network, according to the present invention.

Coefficients $b_i$ on the right of the expression (1) are the coefficients e.g. in the polynomial S2(Z), i.e. they are in general the coefficients of the sum polynomial, so that the following relations can be written as:

$$NXC1 = C5 \oplus D5 \oplus C2 \oplus D2 \oplus C1 \oplus D1$$

$$NXC2 = C6 \oplus D6 \oplus C3 \oplus D3 \oplus C2 \oplus D2$$

$$NXC3 = C7 \oplus D7 \oplus C4 \oplus D4 \oplus C3 \oplus D3$$

$$NXC4 = D8 \oplus C5 \oplus D5 \oplus C4 \oplus D4$$

$$NXC5 = C6 \oplus D6 \oplus C3 \oplus D3$$

$$NXC6 = C7 \oplus D7 \oplus C3 \oplus D3$$

$$NXC7 = D8 \oplus C4 \oplus D4 \oplus C1 \oplus D1 \qquad (2)$$

Where bits $C_i$ are the current value of the remainder polynomial Q, bits $NXC_i$ are the next value of the next remainder polynomial Q; as said above, bits $D_i$ correspond to bits X previously mentioned with reference to FIG. 1 of the incoming trace identifier TI. NXCi correspond to the polynomial coefficients on the right in the expression (1). Calling j an integer index ranging 1 to 16 and changing in the byte number BY1 ... BY16 that forms the 16-bytes trace identifier BY16, then bits Ci will correspond to the byte BYj, and bits NXCi to the byte Byj+1.

Thus, the validation word WCRC7 is computed as the trace identifier TI arrives, byte by byte, calculating bits NXCi iteratively till they represent the values of the validation word WCRC7.

Based on these remarks, when the first byte of a trace identifier TI arrives, the sync pulse SYNC produced by the multiframe aligner block ALL16 initiates the redundancy coding detector CRC and the byte will reach the redundancy coding detector CRC after the bits Ci have been set to zero. After all the 16 bytes of the trace identifier TI have passed, there will be a validation word WCRC7 calculated according to relations (2), which can be compared with bits $C_i$ contained in the next trace identifier TI. If the comparison gives a positive result, the redundancy code detector CRC will generate a correct validation word signal CRC7.

The mismatch detector DSL16 compares the input received bytes of the trace identifier TI with the bytes of the expected trace identifier ETI, received at another input. This comparison operation is controlled at each sync pulse SYNC issued by the multiframe aligner block ALL16 and generates a matching signal MTC16, as a function of the matching or not of the 16 bytes of the received trace identifier TI with the 16 bytes of the expected trace identifier ETI.

The matching signal MTC16 and correct validation word signal CRC7 are then sent to the input of a command generator CG16. Said command generator CG16 also receives the expected length signal S161 at its input and outputs the equality signal SVAL16, which takes the following values:

true value V, if the correct validation word signal CRC7 is true, the matching signal MTC16 is true and the expected length signal S161 indicates a 16-bytes length;

false value F, if the correct validation word signal CRC7 is true and the matching signal MTC16 is false or the expected length signal S161 indicates a 1-byte length;

do not care value DC in all the other cases.

Thus, as better explained later, the command generator CG16 will cause evolution of the finite states machine TMAC only if the received trace identifier TI is validated.

FIG. 4 shows a diagram of the 1-byte validation block VAL1. Said 1-byte validation block VAL1 receives at its input the trace identifier TI, the expected length signal S161 and the expected trace identifier ETI. A module sexteen counter block CNT16 is provided. Said module sixteen counter block generates the sync pulse SYNC every 16-bytes. Therefore, the module sixteen counter block CNT16 performs a function quite similar to that of the multiframe aligner ALL16, i.e. it generates the sync pulse SYNC, but it will only emulate its behaviour. As a matter of fact, 1-bite length trace identifiers TI are apparently not structured in frames nor do they contain frame markers, so that the module sixteen counter block CNT16 will limit itself to issue the sync pulse SYNC with the same period of the multiframe aligner block ALL16, so as to maintain a temporary matching between the 16-bytes validation block VAL16 and the 1-byte validation block VAL1. Therefore, a 16-bytes integrator block IGT similar to the structure of the 16-bytes validation block VAL16 is provided, which will start integrating the received bytes upon receiving the sync pulse SYNC; if 16 subsequent bytes are equal, then the 16-bytes integrator block IGT will issue a constant packet signal CNST. Parallel with the 16-bytes integrator block a matching detector DSL1 receives at its inputs the trace identifier TI and the expected trace identifier ETI, compares it and generates a matching signal MTC1. This comparison is controlled by the sync pulse, so that the matching signal MTC1 will be issued if the 16 bytes received are matching with the expected trace identifier ETI.

Therefore a command generator CG1 identical to the command generator CG16 is provided. Then, the matching signal MTC1 and constant packet signal CNST are sent to the input of a command generator CG1. Said command generator CG1 also receives on its input the expected length signal S161 and outputs an equality signal SVAL1, which takes the following values:

true value V, if the constant identifier signal CNST is true, the matching signal MTC1 is true and the expected length signal S161 indicates 1-byte length.

false value F, if the constant identifier signal CNST is true and the matching signal MTC1 is false or the expected length signal S161 indicates a 16-bytes length.

do not care value DC in all the other cases.

Figure 5:
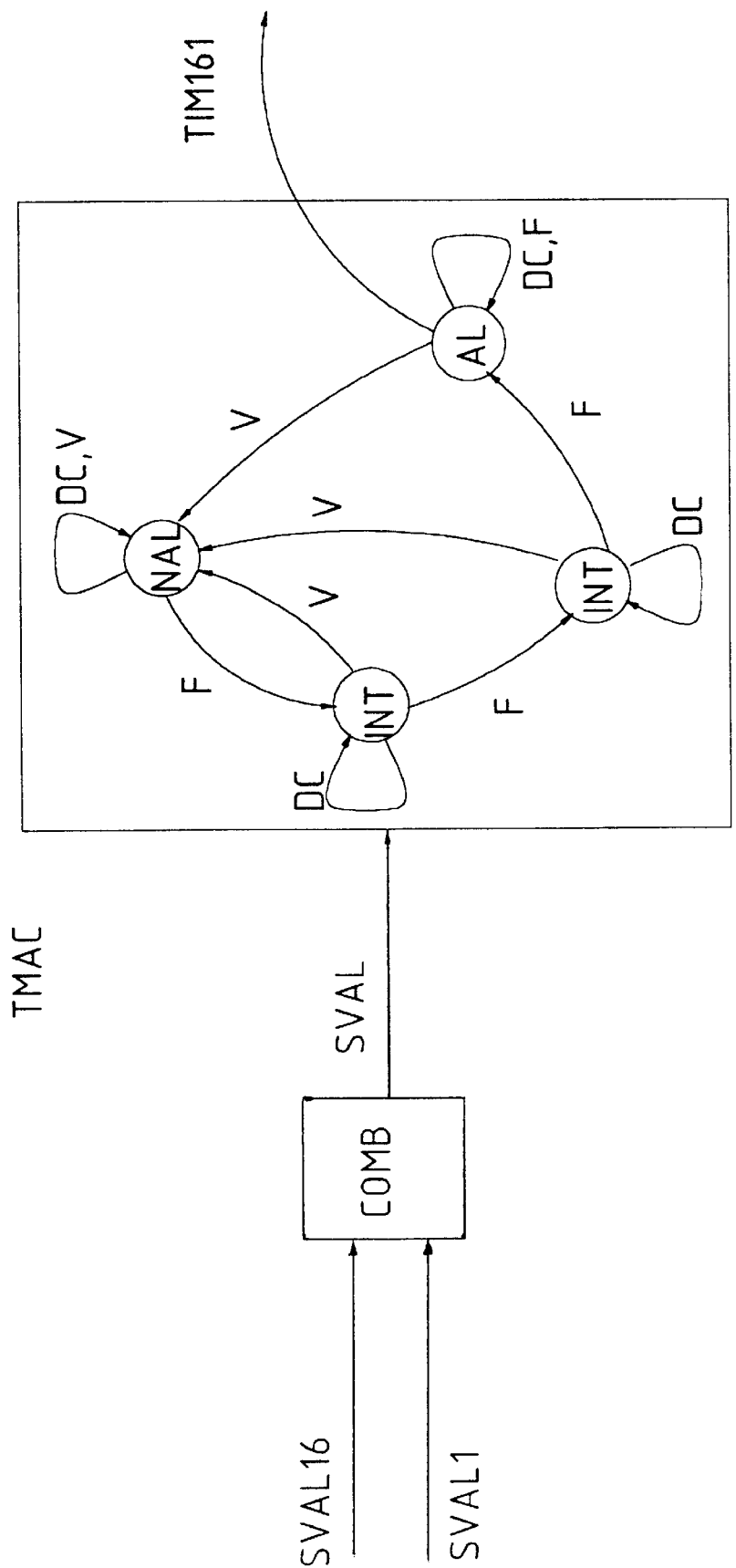
FIG. 5 shows a schematics of third circuitry details of the circuit implementing the mismatch detection method in trace identifiers contained in frames, in particular SDH-coded data frames within a telecommunication network as represented in FIG. 2.

FIG. 5 shows the end part of the diagram of FIG. 2, with the combiner block COMB, and with the finite states machine TMAC represented by its state diagram.

The combiner block COMB is a logic circuit whose function consists substantially in summing up equality signals SVAL1 and SVAL16 to obtain a correct equality signal SVAL. As a matter of fact, due to the logic implemented by command generators CG1 and CG16, only one between the two equality signals SVAL1 and equality signal SVAL16 can take the true value V or false value F at the same time, while the other shall imperatively take the don't care value DC. Therefore, in this case the equality signal SVAL will take the value between the equality signal SVAL1 and the equality signal SVAL16 that does not correspond to the don't care value DC. On the other hand, it may happen that both the equality signals SVAL1 and SVAL16 take the don't care value DC. Then, in this instance the equality signal SVAL will also take the don't care value DC.

As it can be seen, the finite states machine TMAC consists of four states: an alarm state AL, a non alarm state NAL and two intermediate states INT. If a false value F for the equality signal SVAL is received it will cause the finite states machine TMAC to evolve towards the alarm state AL, whereas if a true value V is received it will cause the finite states machine TMAC to evolve towards the non alarm state NAL. If the don't care value DC is received it will leave the finite states machine TMAC in the state it is found. The function of intermediate states INT is to prevent the first false value F taken by the equality signal SVAL from bringing the finite states machine TMAC immediately in the alarm state AL. Intermediate states INT shown here are only in number of two, but generally as many intermediate states INT as desired can be set. In fact, the function of intermediate states INT is to avoid that line errors, possibly due to a high Bit Error Rate, may immediately bring the finite states machine TMAC in the alarm state AL. It is possible, for instance, to select the number of intermediate states INT as a function of said Bit Error Rate. It is obvious that said intermediate states INT can also be preset on the alarm state path AL for the non-alarm state NAL, should it be necessary.

When the finite states machine TMAC reaches the alarm state AL it will generate the misconnection event signal TIM161.

The second finite states machine TMACX is similar to the finite states machine TMAC, but it will generate a non structured packet signal TIMX if a correct validation signal CRC7 or a constant packet signal CNST is not received within 8 times 16-bytes.

The misconnection alarm signal TIM results from the sum of the misconnection event signal TIM161 and non structured packet signal TIMX.

From the above it will be obvious how the mismatch detection circuit operates in trace identifiers 1 according to the present invention.

The trace identifier TI is sent to two parallel branches, of which one is related to 16-bytes length trace identifiers TI, i.e. the 16-bytes validation block VAL16, and the other is related to 1-byte length trace identifiers TI and 1-byte validation block VAL1. The 16-bytes block VAL16 and 1-byte validation block VAL1 have a functionally similar structure, even if some differences are due to the different frame length and structure they have to handle. Said blocks include in fact means for generating the sync pulse SYNC, i.e. the module sixteen counter block CNT16 and the multiframe aligner block ALL16, timing the operation of both the validation means of the received identifier and matching control means between the received identifier and expected identifier. Matching control means, i.e. the matching detector DSL1 and matching detector DSL16, have substantially the same structure, apart a different length of the identifiers wherein they operate, whereas validations means of the received identifier, i.e. the redundancy coding detector CRC and 16-bytes integrator block IGT have different complexities and structures due to the high difference between the 16-bytes identifier and the 1-byte identifier. However, they both produce a simple validation signal, i.e. the correct validation word signal CRC7 and constant identifier signal CNST, which are used to enable operation of command generators CG16 and CG1. As a result, only the validation operation of the trace identifier TI will enable information to be forwarded to a likely misconnection represented by matching signals MTC16 or MTC1 and subsequent driving of the finite states machine TMAC. It should be noted that in this case the trace identifier TI does not need to be stored in a memory circuit, but both the validation operation and comparison operation in the trace identifier TI will gradually occur simultaneously in parallel as the bytes of the trace identifier TI are received.

The finite states machine TMAC evolves only when the trace identifier TI is correct and intermediate states INT are provided to avoid e.g. that a double line error may lead to validation of a trace identifier TI, which should not be validated, and a simultaneous comparison may generate a false matching signal MTC1 or MTC16, so that the finite states machine TMAC will immediately generate the misconnection signal TIM, when the subsequent identifiers will then have generated 'don't care' or 'true' conditions.

The features of the present invention are obvious from the above description as also its advantages are clear.

The mismatch detection method in trace identifiers contained in frames, in particular SDH-coded data frames in a telecommunication network according to the present invention allows validation and a comparison with the expected trace identifiers having different lengths and structures.

Advantageously, the mismatch detection method and circuit in trace identifiers contained in SDH frames allows parallel execution of validation and comparison, analysing the trace identifiers as they are received, without the need to preset memory circuits to store one or more frames.

The coding word CRC-7, which is dictated by the above mentioned standards within the frame of a 16-bytes trace identifier to validate said 16-bytes trace identifiers, is advantageously used. Moreover, a parallel calculation procedure to the validation word CRC-7 is implemented, which also avoids the use of memory circuits for frame storage and execution of the required polynomial operations. Said calculation procedure is particularly beneficial as it uses the validation word CRC-7 already provided in the trace identifier, not for the purposes of validation operations, but merely for error detection in the identifiers.

Moreover, the use of a finite states machine is advantageously provided to generate the misconnection signal, so that through the structure of said finite states machine misconnection signal events can be put in relation with line errors events.

Finally, the use of another finite states machine is indicated, to generate the misconnection signal also when mismatched frames are received.

As a conclusion, the mismatch detection method and circuit in trace identifiers in SDH frames allow detection and a consequent action for each bit sequence, which may come up at the receiver, in other words a 16-bytes trace identifier, a 1-byte trace identifier or a mismatch sequence with respect to the first two.

It is obvious that many changes are possible for the man skilled in the art to the detection method in trace identifiers contained in frames, in particular SDH-coded data frames within a communication network as described by way of example, without departing from the novelty spirit of the innovative idea, and it is also clear that in practical actuation of the present invention the components may often differ in form and size from the ones described and be replaced with technical equivalent elements.

For instance, instead of using the redundancy coding algorithm and relevant validation word contained in the trace identifier, a persistence type method may be equally used for the 16-byte string validation, such as used for the 1-byte trace identifier, i.e. an integration operation.

What is claimed is:

1. A mismatch detection method for trace identifiers contained in frames, in particular SDH-coded data frames, within a telecommunication network, wherein received trace identifiers are compared with expected trace identifiers in determined locations of the telecommunication network, for verifying if a misconnection event has occurred and generating a corresponding alarm signal, said method comprising the following steps:

a) validating a received trace identifier and issuing a corresponding validation signal;
   b) in parallel with step a), comparing the received trace identifier with an expected trace identifier (ETI) and issuing a corresponding match signal;
   c) evaluating the validation signal and the match signal; and
   d) generating a matching state signal according to the result of said evaluation as per step c), wherein steps a) to d) are provided both for 16-byte length trace identifiers and 1-byte length trace identifiers, and wherein the validating step is carried out through a Cyclic Redundancy Code check in case of 16-byte length trace identifiers and a Persistency Check in case of 1-byte length trace identifiers.

2. A method according to claim 1, wherein step d) includes the step of generating a matching state signal taking at least three different logic states, one of which is represented by a true logic state controlling the issue of an alarm signal.

3. A method according to claim 2, wherein the step of generating a matching state signal includes the step of generating a signal further taking a false logic state and a don't care logic state wherein the don't care state is associated with a missed validation signal.

4. A method according to claim 3, wherein the step of generating a matching state signal taking the false logic state is determined at least by the simultaneous receipt of the validation signal and missed matching signal.

5. A method according to claim 2, wherein the step of generating a matching state signal taking the true logic state is determined at least by the simultaneous receipt of both the validation signal and the matching signal.

6. A method according to claim 5, further including the step of providing an expected length signal of the trace identifier and using it in step c) combined with the validation signal and the matching signal.

7. A method according to claim 6, further comprising the step of using the mismatch state signal to drive the evolution of a finite states logic means.

8. A method according to claim 1, wherein step a) is executed using a validation word contained in the 16-byte length trace identifier and cyclic redundancy coding algorithm.

9. A method according to claim 8, wherein the validation step a) is executed using the validation word which is calculated upon receiving the trace identifier by an iterative procedure performing an iteration for each byte received.

10. A method according to claim 9, wherein said iterative procedure comprises the following steps: i) executing a division operation between the polynomial representation of each byte of the received trace identifier and a polynomial generator; ii) executing a summing operation between the remainder of said division operation and the polynomial representation of the subsequent byte; iii) executing a division operation between the result of said summing operation and the polynomial generator; and iv) executing an iterative repetition of steps ii) to iii) for all bytes of said trace identifier.

11. A mismatch detection circuit for trace identifiers contained in data frames, particularly SDH-coded data frames, within a telecommunication network, the circuit comprising:

means for validating received trace identifiers and issuing a corresponding validation signal;
   means for comparing the received trace identifier with an expected trace identifier and issuing a corresponding match signal;
   means for evaluating the validation signal and the match signal; and
   means, responsive to said evaluating means, for generating a matching state signal, wherein said validation means and said match detection means are arranged in parallel with respect to the input of the received trace identifier with both their outputs being connected with a logic means suitable to generate match state signals and wherein the circuit is able to operate on both 16-byte length trace identifiers and 1-byte length trace identifiers, wherein the validating means operate through a Cyclic Redundancy Code check in case of 16-byte length trace identifiers and a Persistency Check in case of 1-byte length trace identifiers.

12. A circuit according to claim 11, further including a finite state logic means, the match state signals being sent to said finite state logic means in order to generate a misconnection alarm signal.

13. A circuit according to claim 12, further including an auxiliary finite state logic means which is arranged in parallel to the finite state logic means and is able to issue a non structured identifier signal after receipt of validation signals.

* * * * *